United States Patent [19]

Ishizuka

[11] Patent Number: 4,965,614
[45] Date of Patent: Oct. 23, 1990

[54] RECORDER WITH DUAL MADE OPERATION

[75] Inventor: Kiminori Ishizuka, Tokyo, Japan

[73] Assignee: Kabushiki Kaisha Toshiba, Kanagawa, Japan

[21] Appl. No.: 322,451

[22] Filed: Mar. 10, 1989

[30] Foreign Application Priority Data

Apr. 22, 1988 [JP] Japan .............................. 63-54326[U]

[51] Int. Cl.$^5$ ......................... G01D 9/00; G01D 15/16
[52] U.S. Cl. .................................. 346/34; 346/139 R
[58] Field of Search ................. 346/139 R, 34, 107 R, 346/108, 29, 44, 45

[56] References Cited

U.S. PATENT DOCUMENTS

| | | | |
|---|---|---|---|
| 3,195,141 | 7/1965 | Brown et al. | 346/34 |
| 3,605,109 | 1/1970 | Tyler | 346/34 |
| 4,074,273 | 2/1978 | Dupree et al. | 346/34 |

Primary Examiner—Mark J. Reinhart
Attorney, Agent, or Firm—Finnegan, Henderson, Farabow, Garrett, and Dunner

[57] ABSTRACT

A recorder for recording a plurality of measurement quantities on a recording format. The recorder is provided includes a selection unit for selecting one of the plurality of measurement quantities, and a recorder unit for recording discontinuously in a given order the plurality of measurement quantities, and selectively recording continuously the selected one of the plurality of measurement quantities when the selection means selects one of the plurality of measurement quantities.

5 Claims, 3 Drawing Sheets

RECORDER WITH DUAL MADE OPERATION

BACKGROUND OF THE INVENTION

The invention relates to a recorder and more particularly to a recorder for recording various types of signals as analog data on recording paper.

In general, industrial recorders that record changes in voltage and temperature, etc., include, first, the point plotting type, in which a plurality (6 to 24) of measurement points are discontinuously measured by sequential switching and the respective measured signals are recorded on recording paper, and, second, the continuous recording pen type, in which measured values at one to four locations are continuously measured simultaneously and the respective measured values are continuously recorded on recording paper. In the above described point plotting type, a measurement is made every few tens of seconds at a single measurement point, so this type is appropriate for cases in which the object of measurement varies slowly. In contrast, the pen type is appropriate in cases where the fluctuation is severe, or where there are no gaps in the measured values. For measurement in cases where there is little variation in the input such as, in general, temperature, a point plotting type recorder is used. However, during plant start up, etc., it is sometimes necessary to make a continuous recording of specific measurements. Accordingly, in addition to the above point plotting type recorder, a pen type recorder is provided. This involves problems of increased cost and of use of space on the instrumentation panel.

SUMMARY OF THE INVENTION

It is an object of this invention to record discontinuously a plurality of analog data and continuously a selected one of the analog data.

Another object of the invention is to make it possible to automatically record discontinuously a plurality of analog data and continuously a selected one of the plurality of analog data.

The foregoing objects are achieved according to the present invention by providing a recorder for recording a plurality of measurement quantities on a recording format. The recorder comprises a selection means for selecting one of the plurality of measurement quantities, and recorder means for recording discontinuously in a given order the plurality of measurement quantities, and selectively recording continuously the selected one of the plurality of measurement quantities when the selection means selects one of the plurality of measurement quantities.

According to another aspect of the present invention, the above objects are achieved by providing a method of recording a plurality of measurement quantities on a recording format. The method comprises the steps of recording discontinuously in a given order the plurality of measurement quantities, and selectively recording continuously one of the plurality of measurement quantities.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its attendant advantages will be readily obtained by reference to the following detailed description considered in connection with the accompanying drawings, in which.

DESCRIPTION OF THE PREFERRED EMBODIMENTS

Figure 1:
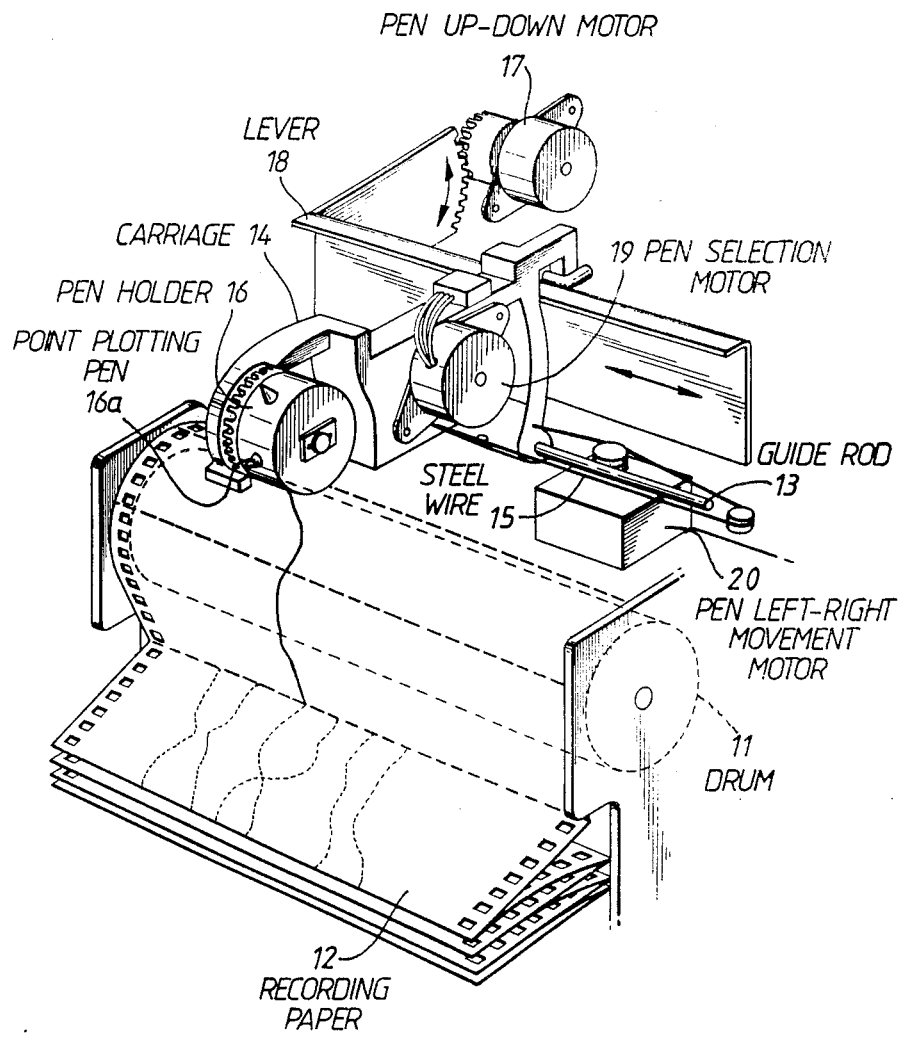
FIG. 1 is an external view showing the principal parts of a recorder according to the invention.

Referring now to the drawings, FIG. 1 shows an improved recorder which includes a preferred embodiment of the invention. This embodiment of the device of this invention is described below with reference to FIG. 1. Reference numeral 11 is a drum for feeding recording paper 12. A guide rod 13 is arranged on one side of drum 11. On this guide rod 13 there is mounted in a reciprocal manner a carriage 14 that is made to reciprocate by a steel wire 15. At the leading end of carriage 14 there is mounted a pen holder 16 from which a plurality of point plotting pens 16a, 16b and so on of mutually different printing colors project with prescribed separation in the circumferential direction, being mounted so as to be rotatable about the axis of pen holder 16. Carriage 14 can be moved vertically by a pen up-down motor 17 that drives a lever 18.

Figure 2:
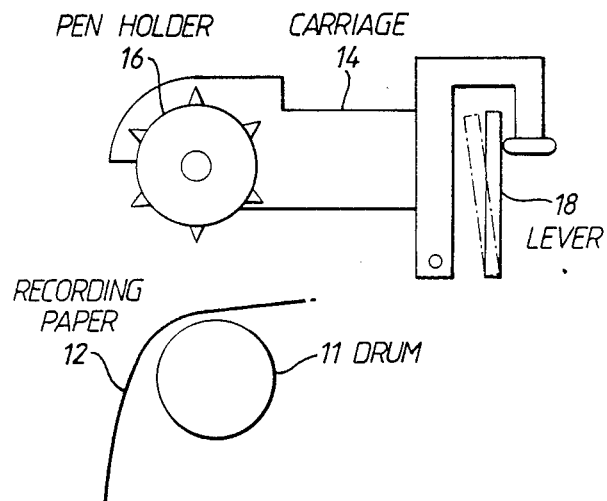
FIG. 2 is a view showing the operation of the printing part of a recorder according to the invention.

Carriage 14 is equipped with point plotting pens 16a, 16b and so on. These are connected to pen selection motor 19 which operates to rotate the pens. Steel wire 15 is connected to a pen left-right movement motor 20. Steel wire 15 is also connected to carriage 14. Carriage 14 is shifted in the left-right direction by rotation of motor 20 and the consequent movement of steel wire 15. Also, by rotation of motor 19 transmitted through the gears of motor 19, lever 18 operates as shown in FIG. 2, to shift carriage 14 in the vertical direction. Drum 11 is also motor driven by a motor 28, not shown but built into drum 11.

Figure 3:
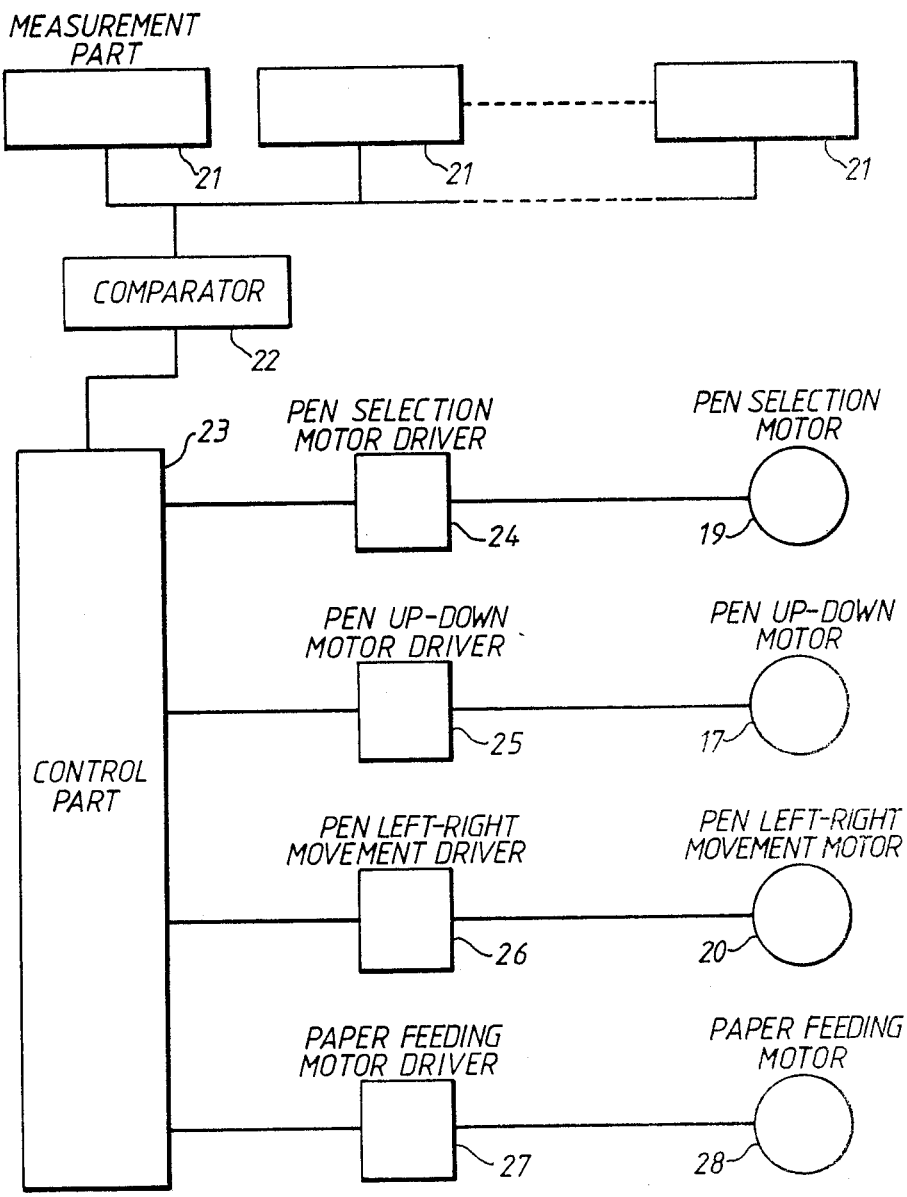
FIG. 3 is a diagram showing a control system of the printing part of the recorder according to the invention.

FIG. 3 shows a diagram of control system of this invention. Signals from measurement parts 21 are compared with respective set values in a comparator 22. If any signal exceeds the set value, a control part 23 selects the corresponding measurement part. Control part 23 then sends a signal to a pen rotation motor driver 24 for driving pen rotation motor 19, causing the tip of the pen of the selected part to be moved to the down position. A signal is also sent to a pen up-down motor driver 25 for driving pen up-down motor 17, so that a carriage-down position as shown in FIG. 2 is obtained. The measurement value data is input to control part 23, which sends a signal to the pen left-right movement motor driver 26 for driving pen left-right movement motor 20, which causes a data mark to be made by the pen. Recording paper is fed by a paper feeding motor driver 27 for driving a paper feeding motor 28 which is built in drum 11.

Figure 4:
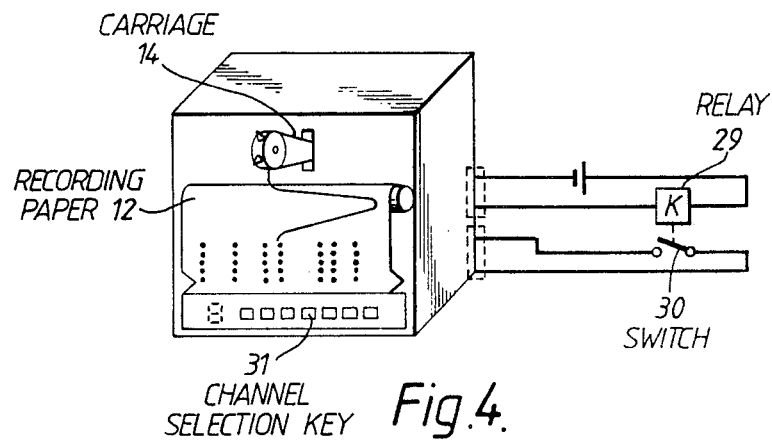
FIG. 4 is a schematic external view showing a recorder according to the invention.

FIG. 4 shows a schematic external view of a recorder of this invention. If, for example, the input from a particular measurement part is abnormal, a relay 29 is actuated, causing a switch 30 of mode changeover device operating circuit to close, so that the comparator is actuated. First of all, the position of the measurement part at which the abnormal input is generated is detected and carriage 14 is shifted to the recording position corresponding to the measurement part, by means of steel wire 15, and is stopped in this position. At the same time, pen holder 16 is rotated, so that a point plotting pen 16a of the printing color corresponding to the measuring part is made to face recording paper 12. Carriage 14 is then tilted downwards through operation of lever 18, bringing point plotting pen 16a into contact with recording paper 12 and holding it in this position.

Consequently, as shown in FIG. 1, when point plotting printing recording is performed sequentially on recording paper in response to input from a plurality of measurement parts, if there is abnormality in the input from one measurement part, this measurement part is detected by the comparator, causing carriage 14 to be shifted and held in the recording position corresponding to this measurement part. Thus, the prescribed point plotting pen 16a is brought into contact with the recording paper, and the measured values shown by the continuous line in FIG. 1 are recorded on this recording paper as a continuous fluctuation curve.

If there is no abnormality as mentioned above, switch 30 is opened through relay 29, returning to the initial point plotting printing state.

It should be noted that in the above embodiment, the comparison is performed automatically, but the comparison could be performed by operating a channel selection key 31. Alternatively, a changeover from point plotting type recorder to pen type recorder, or the other way around, can be effected by a simple switch changeover.

Numerous modifications and variations of the present invention are possible in light of the above teachings. It is therefore to be understood that, within the scope of the appended claims, the present invention can be practiced in a manner other than as specifically described herein.

What is claimed is:

1. A recorder for recording a plurality of measurement quantities on a recording medium comprising:
    comparator means for comparing the plurality of measurement quantities with respective predetermined setpoints, said comparator means including selection means for automatically selecting one of the plurality of measurement quantities when said one of the measurement quantities exceeds said respective predetermined setpoint; and
    recorder means for recording the plurality of measurement quantities, having a first mode of operation wherein the plurality of measurement quantities are recorded discontinuously on the recording medium in a given order, and a second mode of operation wherein said one of the measurement quantities selected by said selection means is recorded continuously on the recording medium.

2. The recorder of claim 1, wherein said recorder means includes carriage means for movement in three dimensions.

3. The recorder of claim 2, wherein the carriage means includes a plurality of rotatable markers.

4. A method of recording a plurality of measurement quantities on a recording medium, comprising the steps of:
    comparing the plurality of measurement quantities to respective predetermined setpoints;
    recording the plurality of measurement quantities discontinuously on the recording medium in a given order when the measurement quantities are less than said respective predetermined setpoints; and
    recording one of the measurement quantities continuously on the recording medium when said one measurement quantity exceeds its respective predetermined setpoint.

5. The method of claim 4, wherein the step of recording includes a step of plotting the measurement quantities on the recording medium by a plurality of rotatable markers disposed to move alternatively in three dimensions.

* * * * *